US008534039B1

(12) United States Patent
Pierson et al.

(10) Patent No.: US 8,534,039 B1
(45) Date of Patent: Sep. 17, 2013

(54) HIGH PERFORMANCE AIR-COOLED COMBINED CYCLE POWER PLANT WITH DUAL WORKING FLUID BOTTOMING CYCLE AND INTEGRATED CAPACITY CONTROL (75) Inventors: Thomas L. Pierson, Sugar Land, TX (US); Herman Leibowitz, Danville, CA (US)

(73) Assignee: TAS Energy, Inc., Houston, TX (US)

( * ) Notice: Subject to any disclaimer, the term of this patent is extended or adjusted under 35 U.S.C. 154(b) by 0 days.

(21) Appl. No.: 13/586,673

(22) Filed: Aug. 15, 2012

Related U.S. Application Data (60) Provisional application No. 61/624,824, filed on Apr. 16, 2012.

(51) Int. Cl.
*F02C 1/00* (2006.01)
(52) U.S. Cl.
USPC .......................................... 60/39.182; 60/728
(58) Field of Classification Search
USPC ........................ 60/39.182, 728, 39.181, 39.5
See application file for complete search history.

(56) References Cited

U.S. PATENT DOCUMENTS 6,260,347 B1 *  7/2001  Bronicki et al. ................. 60/774
2004/0011046 A1 *  1/2004  Pierson ............................ 60/772

* cited by examiner

*Primary Examiner* — Phutthiwat Wongwian
*Assistant Examiner* — Vikansha Dwivedi
(74) *Attorney, Agent, or Firm* — Haynes and Boone, LLP (57) ABSTRACT A combined cycle power plant system and methods of operation so as to minimize consumption of cooling water utilizes exhaust from a combustion turbine to generate steam for power generation in a steam turbine topping cycle. The exhaust steam from the steam turbine topping cycle is utilized to vaporize an organic working fluid in an organic working fluid bottoming cycle, where vaporized organic working fluid expanded across a turbine generates additional power. Exhaust gas from the organic working fluid bottoming cycle is condensed utilizing an air-cooled heat exchanger. Heat exchange bundles of the air-cooled heat exchanger are preferably arranged horizontally relative to the ground to maximize efficiency. Turbine inlet cooling is employed at the combustion turbine to recapture energy lost in the system. A thermal energy storage tank may be utilized in conjunction with the turbine inlet cooling to supply chilling water to the system.

20 Claims, 5 Drawing Sheets

HIGH PERFORMANCE AIR-COOLED COMBINED CYCLE POWER PLANT WITH DUAL WORKING FLUID BOTTOMING CYCLE AND INTEGRATED CAPACITY CONTROL

PRIORITY

This application is a non-provisional of and claims priority to U.S. Provisional Application No. 61/624,824 entitled, "HIGH PERFORMANCE AIR-COOLED COMBINED CYCLE POWER PLANT WITH DUAL WORKING FLUID BOTTOMING CYCLE AND INTEGRATED CAPACITY CONTROL," filed Apr. 16, 2012, also naming Thomas L. Pierson and Herman Leibowitz as inventors, the disclosure of which is hereby incorporated by reference in its entirety.

BACKGROUND OF THE INVENTION

The reduction of water consumption and use is emerging as a top priority for all types of power plants as a result of water supply constraints in many regions of the world. Several factors contribute to intensified water scarcity, including increased demands for electricity, increased water use in other sectors (for example, agriculture, municipal water supply, mining, and manufacturing), tightened government regulations, population growth, new development, and weather variation (including precipitation and temperature). Constraints on cooling water supplies impact plant site and permitting decisions and current plant operations. Furthermore, there is increasing pressure on the industry to eliminate once-through cooling systems. However, replacing once through systems with the more common wet cooling towers may reduce the water circulation rate but does not reduce the overall water consumption (i.e., same amount of water is evaporated in the cooling process).

More specifically, utility scale thermal power plants traditionally have used water from an evaporative cooling tower to condense the steam coming from the low temperature exhaust of a condensing steam turbine used in the thermal bottoming cycle. This results in large amounts of water evaporated for every MW-Hr of power produced. Moreover, such water usage is common in many thermal power plants regardless of whether the thermal energy source is from a coal fired power plant, a nuclear power plant, or a gas turbine, combined cycle power plant. It has been estimated that the approximate water consumption of each type of power plant is:

Combined Cycle=210 gal/MWH
Nuclear=820 gal/MWH
Coal=760 gal/MWH
Biofuel & Concentrated Solar Power=720 gal/MWH Recently combined cycle plants have been designed to replace the water-cooled surface condenser and the evaporative cooling tower with a large air-cooled steam condenser to operate in conjunction with the condensing steam turbine. Large air-cooled condensers can condense the low pressure exhaust from the condensing steam turbine directly in the air-cooled steam condenser. It is estimated that approx 70 power plants in the U.S. have installed some type of air-cooled steam condenser on the steam bottoming cycle of combined cycle power plants. This use of air-cooled steam condensers has eliminated the traditional circulating cooling water loop and the cooling tower, and is an effective way of eliminating the use of water for cooling in the thermal bottoming cycle of a combined cycle plant. However, various drawbacks to prior art air-cooled steam condensers exist. First, to maximize the power output from the steam turbine, the condensing temperature and pressure of the steam must be as low as possible. Thus, typically, the condenser is operated below atmospheric pressure. However, operating the condenser below atmospheric pressure can lead to air infiltration which can lower the capacity output of the power plant and increase corrosion of power plant equipment, which increases the maintenance requirements of the boiler feedwater system. In addition, because steam has a comparatively large volume at low pressure, the back end sections of the steam turbine must be sized quite large for the large specific volume required for this very low pressure steam, thereby adding to the expense and complexity of the overall system. As an example, each pound of steam requires 333 cubic feet at 1 psia (102° F. condensing temperature) or 255 cubic feet at 2.2 psia (120° F. condensing temperature) which are typical operating ranges for an air-cooled condenser. Since the latent heat of vaporization of steam is about 1025 BTU/lb at 120° F., it requires a volume of (255 cubic feet/lb×lb/1025 BTU=) 4 cubic feet/BTU. For this reason, the size of the headers, distribution pipes and tubes in an air-cooled condenser must be relatively large to accommodate the very large volumes of low pressure steam in the system. One result is added capital cost. Moreover, traditional air-cooled steam condensers are typically very large, A-frame designs with fans forcing ambient air up through the A-frame arranged condenser coils. A-frame systems such as this are necessary in order to adequately drain the condenser coils of the steam condensate due to the very low steam pressures. However, such A-frame designs impose added fan power requirements and do not represent ideal fan airflow across the coils, thereby inhibiting the effectiveness of the air-cooled condenser in the efficiency of the overall power system.

Another disadvantage of the prior art practice of utilizing air-cooled steam condensers for the bottoming cycle of combined cycle thermal power plants is that the output of the air-cooled combined cycle plant will be degraded more than that of the traditional water-cooled combined cycle plant because the air-cooled condenser rejects its heat to the higher dry bulb temperature rather than the colder wet bulb temperature of a water cooled combined cycle. This degradation occurs at all temperatures, but especially during the high ambient temperature periods. As the ambient temperature rises, the output from the steam turbine will be reduced due the higher backpressure caused by the higher condensing temperatures experienced by the air-cooled condenser, especially during hot periods of the day when the heat from the condensing steam must be transferred to the ambient air temperature. Also as the ambient temperature increases, the difference between the dry bulb temperature and the coincident wet bulb temperature tends to increase, thereby causing a corresponding increased reduction in the air-cooled combined cycle plant output versus the output of a water cooled plant. This reduction in both gas turbine and steam turbine output occurs generally during the time of peak stress on the electrical grid—a time when power demand is usually highest due to peak HVAC loads, yet when the ability of the gas turbine generation fleet capacity is usually at its lowest. For the foregoing reasons, power plant design continues to strongly favor the more water consumptive wet cooling towers for combined cycle plants rather than air-cooled condensing.

There is an increasing need for new designs which can minimize water usage in both existing as well as future new power plants and yet maintain plant power output, especially during high ambient temperature peak periods.

BRIEF SUMMARY OF THE INVENTION

The current invention seeks to greatly reduce or eliminate the need for cooling water in large scale, combined cycle power plants while eliminating the drawbacks typically associated with air-cooled condensing bottoming cycles. Moreover, the current invention would greatly reduce or eliminate the variation in combined cycle plant performance of an air-cooled plant when compared to a water-cooled plant, particularly during periods of high demand and periods during the day or season when ambient temperatures are elevated.

Generally, the system of the invention employs four circuits. A first steam turbine topping circuit uses water as a first working fluid which circulates via a first circuit pump through a heat recovery steam generator disposed to receive exhaust from a combustion turbine system. Steam produced from the heat recovery steam generator passes through a steam turbine, then through a steam condenser/ORC vaporizer and back to the first circuit pump. A second organic fluid bottoming circuit uses a non-water fluid as a second working fluid which circulates via a second circuit pump through a steam condenser/ORC vaporizer, then through an ORC turbine, then through an air-cooled condenser and back to the second circuit pump. The first circuit and the second circuit cooperate or otherwise overlap with one another via the steam condenser/ORC vaporizer. The third circuit is a refrigeration cycle which circulates a refrigerant working fluid from a compressor to a condenser. The condenser may be a water cooled condenser or it may be an air-cooled condenser. The air-cooled condenser may be the same air-cooled condenser utilized in the second circuit or it may be a separate air-cooled condenser. The refrigerant working fluid will be condensed in the condenser and the liquid refrigerant will then travel through a pressure reduction device, such as a valve or orifice, after which the refrigerant will circulate through an evaporator where the refrigerant will be vaporized. Thereafter, the vaporized refrigerant will then circulate back to the compressor. The fourth circuit is a chilled water circuit that includes a turbine inlet cooling system disposed to cool inlet air of the combustion turbine system. The chilled water will circulate from the evaporator of third circuit to cooling coils of the turbine inlet cooling system. The cooling coils are disposed in the air path of the combustion turbine system. Once chilled water is circulated through the cooling coils, the chilled water is pumped by a fourth circuit pump back to the evaporator of the third circuit. The third circuit and the forth circuit cooperate or otherwise overlap with one another via the evaporator.

Thus, the invention comprises a combined cycle power plant having a combustion turbine with a turbine inlet air cooling system to vary or maintain air mass flow going through the combustion turbine, a steam turbine topping cycle utilizing the exhaust of the combustion turbine as a heat source for producing steam, a steam turbine, and a steam condenser for condensing steam exiting the steam turbine. The invention further comprises an organic working fluid bottoming cycle having an expander to expand a heated vaporized organic working fluid and an air-cooled condenser for condensing the organic working fluid utilizing ambient air as the cooling medium. The steam condenser for condensing steam exiting the steam turbine also functions as an organic fluid vaporizer for the organic fluid bottoming cycle, vaporizing the organic fluid prior to introduction into the expander. Preferably the steam turbine topping cycle utilizes a steam turbine designed for a higher exiting steam temperature and pressure, such as a backpressure steam turbine, rather than the more common condensing steam turbines that are normally used on combined cycle plants. This new backpressure steam turbine is combined with the separate organic working fluid cycle to eliminate the need for the steam to be condensed in the air-cooled condenser. For purposes of the invention, the term "organic working fluid" is used to describe a second working fluid which may be any working fluid other than water and which has a vaporization temperature below that of water as described below. Organic working fluid may include, without limitation, ammonia ($NH_3$) or other non-carbon working fluids.

Rather than condensing steam in the air cooled condenser as common in the prior art, condensing is now done in a two step process. First, the steam leaving the steam turbine is condensed in a heat exchanger, such as a vapor-to-vapor heat exchanger. This heat exchanger may be of any type, but is preferably a shell and tube or a plate and frame type heat exchanger known in the art, with steam on one side of the heat exchanger and the organic working fluid on the other side of the heat exchanger. The second part of the condensing process utilizes heat from the condensing of the steam to vaporize the organic working fluid. This heated organic working fluid is then used to drive a separate expander to produce additional power. Thereafter, the expanded organic working fluid is condensed in an air-cooled condenser. The specific organic working fluid is preferably selected to match the heat release properties of the exhaust steam from the backpressure steam turbine. The separate working fluid will be designed to boil at a higher pressure and a lower temperature (and a lower specific volume) than will more traditional water and this separate working fluid will also condense at a lower volume and temperature than would water. A thermal energy storage (TES) tank may preferably be employed for use with the turbine inlet cooling of the combustion turbine.

DETAILED DESCRIPTION OF THE INVENTION

Figure 1A:
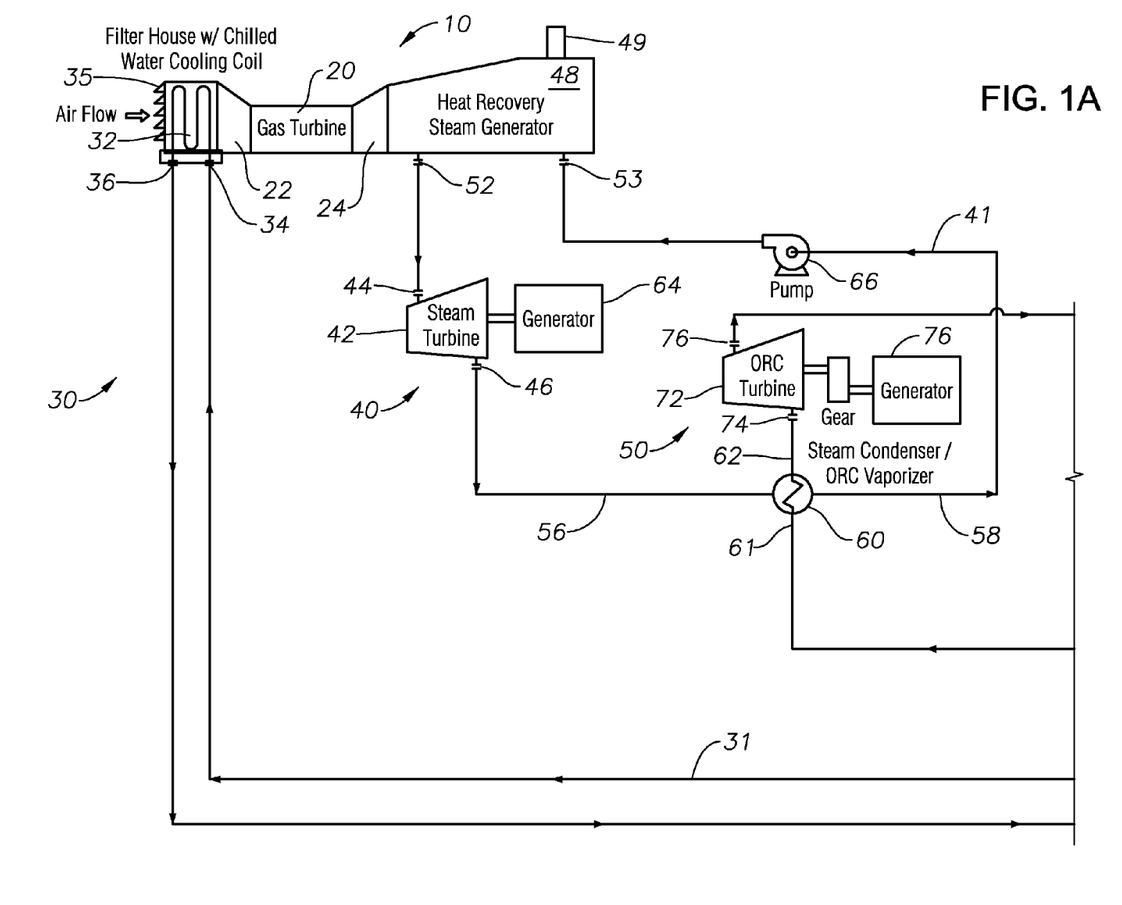
FIGS. 1A and 1B illustrate the four separate fluid circuits of the invention, including a topping steam cycle and a bottoming organic fluid cycle.
Figure 1B:
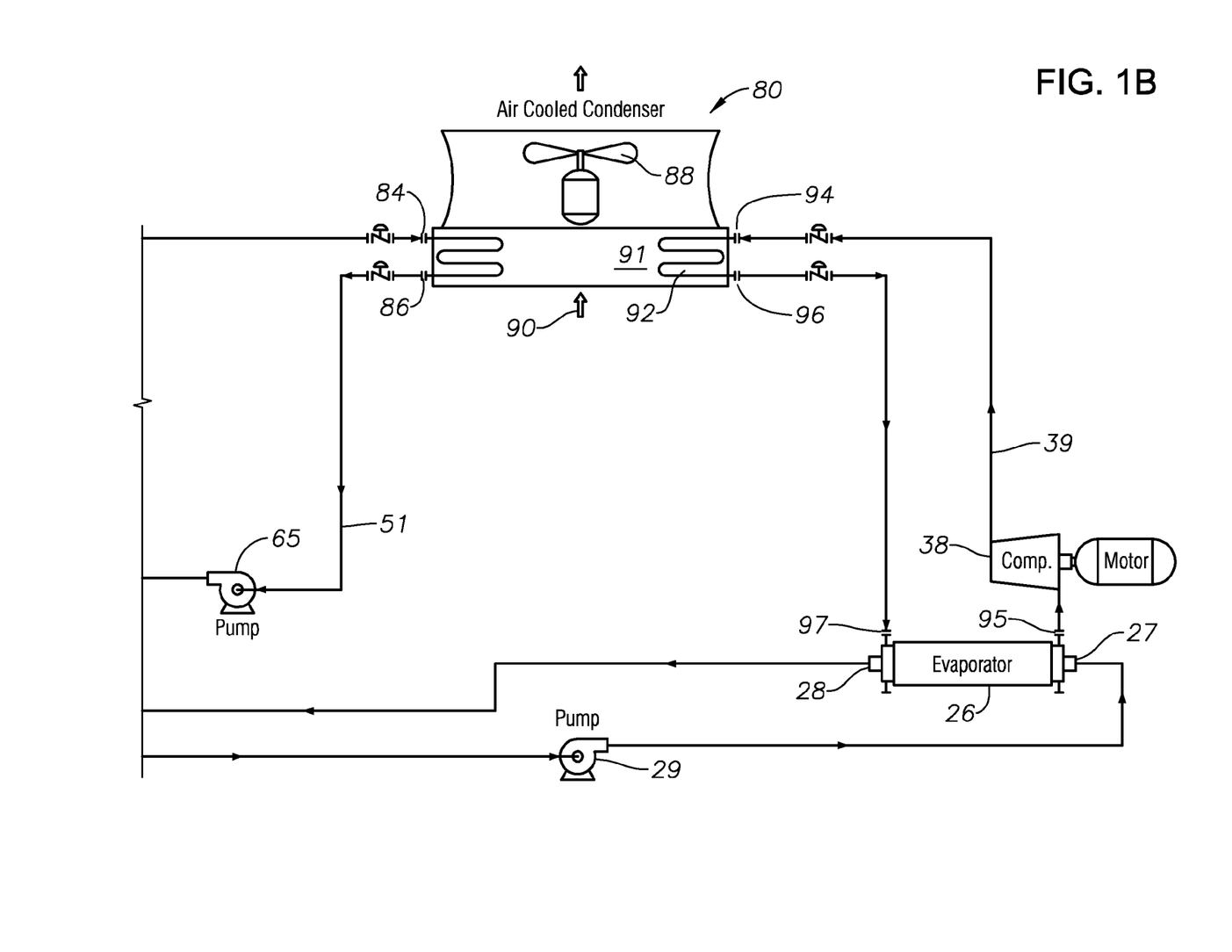

With reference to FIGS. 1A and 1B, there is shown a schematic of a combined cycle power plant 10 of the invention, generally having a combustion turbine 20, a turbine inlet cooling system 30, a steam turbine topping system 40, an organic fluid bottoming system 50, a steam condenser/organic vaporizer 60, and an air-cooled organic fluid condenser 80.

Figure 2A:
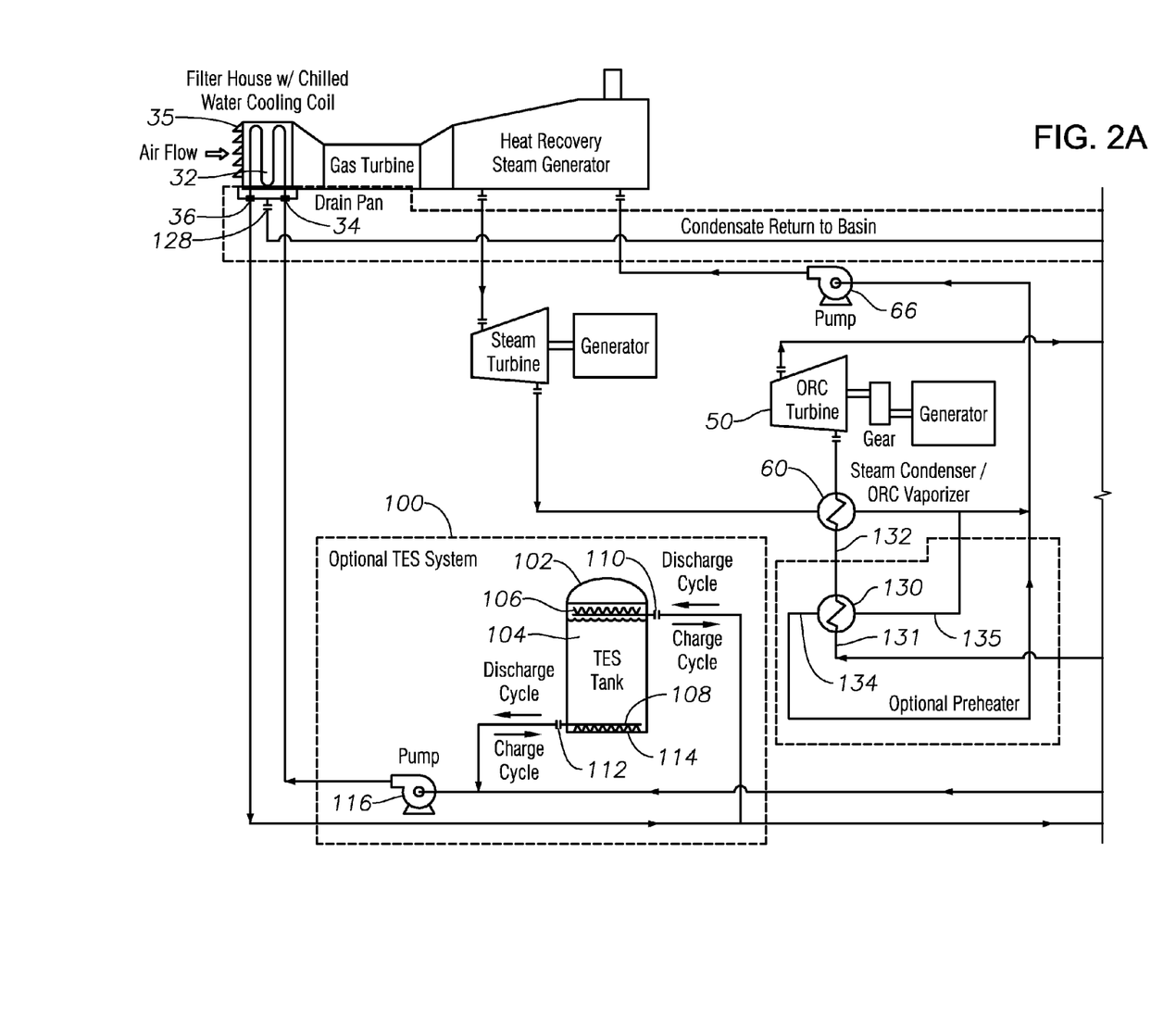
FIGS. 2A and 2B illustrate the system of FIGS. 1A and 1B, but includes an optional Thermal Energy Storage (TES) tank, an optional preheater, and an optional condenser spray system.
Figure 2B:
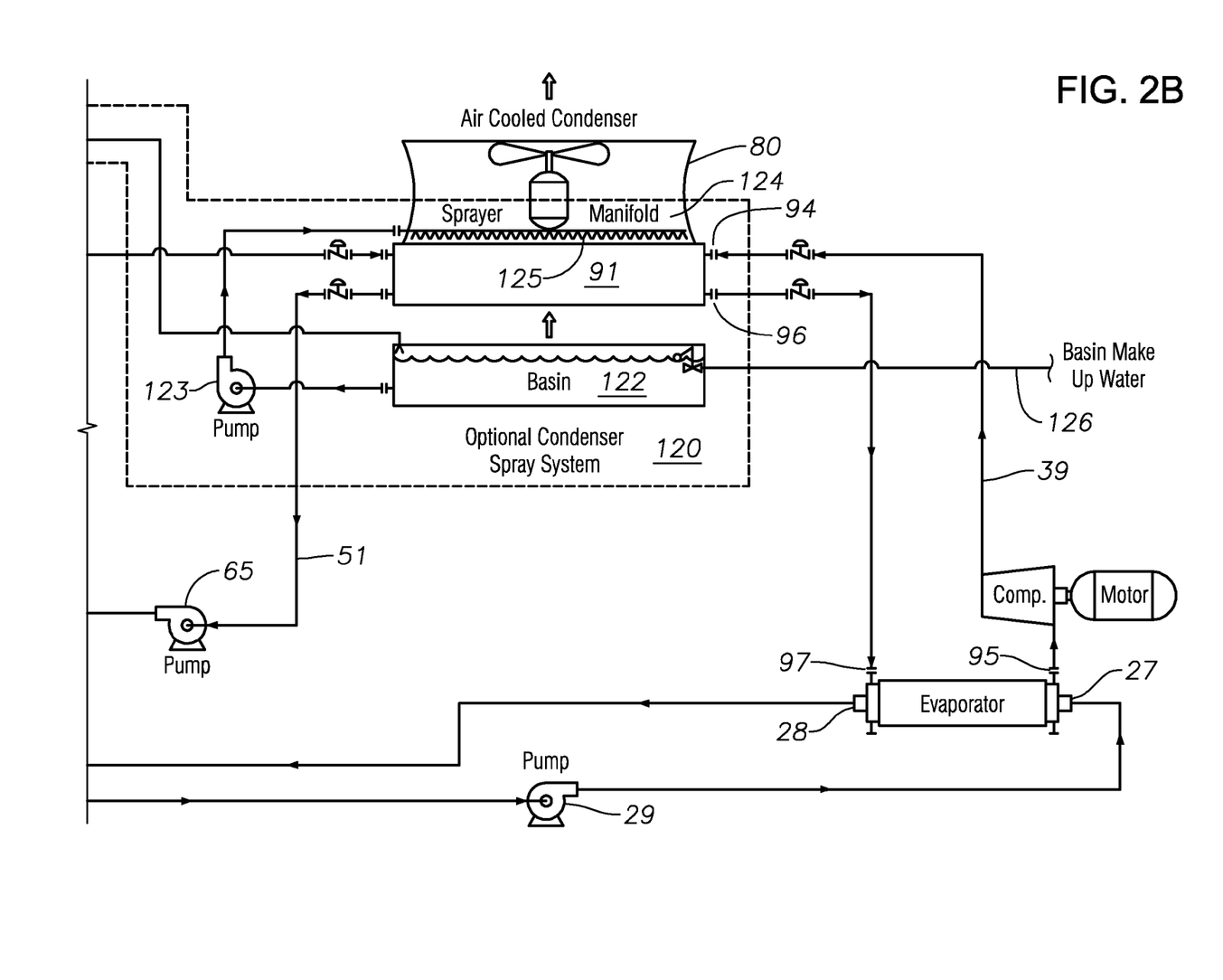

FIGS. 2A and 2B illustrate the same components of power plant 10 as FIGS. 1A and 1B, but include an optional thermal energy storage system 100 and an optional condenser spray system 120, either of which can be used alone with the system of FIGS. 1A and 1B or in combination with one another as part of the system of FIGS. 1A and 1B.

In one preferred embodiment, combustion turbine 20 is a natural gas turbine having an air inlet 35 which would contain or be attached to an air cooling coil 32 of the turbine inlet cooling system 30. The air cooling coil 32 utilizes chilled water circulated therethrough to cool the inlet air to the gas turbine 20. The cooled inlet air would travel through the gas turbine 20 and then be exhausted through duct 24 into a heat recovery steam generator (HRSG) 48 with the cooled exhaust air exiting to the ambient air at stack 49. In addition to air cooling coil 32, turbine inlet cooling system 30 would preferably, include a chilled water primary circulating pump, 29 and an chiller system 26. Chiller system 26 preferably includes an evaporator.

The heat collected by the HRSG 48 would be used in a steam turbine topping system 40 which would utilize water as a first working fluid 41, and generally includes a steam turbine 42 having a steam inlet 44 and exhaust steam outlet 46; the heat recovery steam generator (HRSG) 48 having a first working fluid inlet 53 and a first working fluid outlet 52; and the steam condenser/organic vaporizer 60 having a first working fluid inlet 56, a first working fluid outlet 58, a second working fluid inlet 61 and a second working fluid outlet 62. Steam turbine 42 may be utilized to drive one or more electric generators 64 in a manner well known in the art. A pump 66 may be provided to pump condensed first working fluid from the steam condenser/organic vaporizer 60 to the heat recovery steam generator 48 with first working fluid entering HRSG as a liquid at 53. The heat recovery steam generator 48 is disposed to utilize waste heat in the form of heated exhaust air from the combustion turbine 20 to vaporize the first working fluid with vaporized first working fluid leaving HRSG at point 52 and entering steam turbine 42 at point 44.

In one preferred embodiment, the steam turbine 42 is a backpressure turbine. Those skilled in the art will appreciate that prior art combined cycle power plants typically employ condensing steam turbines because such steam turbines produce low pressure exhaust steam at a condensing temperatures slightly above the ambient air temperature which is used as the heat sink. The present invention would replace the prior art condensing steam turbine with a backpressure steam turbine so as to reduce the cost of the steam turbine and to reduce the volume required in the steam condenser 60. This backpressure steam turbine will not result in as much power generation as the prior art condensing steam turbine because the system of the invention condenses steam at a much higher temperature than the traditional steam bottoming cycle. In certain preferred embodiments, the condensing temperature at condenser 60 would be over approximately 150° F. and preferably in a range of approximately 180° F. to 250° F. as compared to a prior art condensing temperature that would be more typically in the range of 100° F. to 130° F. Persons of ordinary skill in the art will appreciate that the condensing temperature of prior art systems as described herein would be much closer to the ambient dry bulb temperature (if the system utilizes air cooling) or the ambient wet bulb temperature (if the system utilizes watercooling. To regain the lost power from the steam turbine due to the high condensing temperature, the heat from condensing this steam would be reused to vaporize the second working fluid and additional power would be recovered in a second bottoming system described below.

The heat from the condensing steam is transferred to a second working fluid 51 which is utilized in the organic fluid bottoming system 50. The second working fluid 51 is an organic, which for the purposes of the invention, is any fluid other than water, and may include, without limitation, ammonia or other non-carbon fluids. The organic fluid bottoming system 50 generally includes an organic working fluid turbine 72 having a second working fluid inlet 74 and a second working fluid outlet 76, which turbine 72 is utilized to drive one or more electric generators 78 in a manner well known in the art. The second working fluid inlet 74 is in fluid communication with the second working fluid outlet 62 of steam condenser/ORC vaporizer 60 permitting the turbine 72 to receive vaporized organic fluid, i.e., the second working fluid 51, from the vaporizer 60.

Air-cooled condenser 80 is disposed at gaseous inlet 84 to receive the vaporized organic working fluid exhaust from turbine 72 and pass the vaporized organic working fluid through one or more bundle(s) 91 so as to condense the organic working fluid back to a liquid state. Thereafter, the liquid organic working fluid leaves air-cooled condenser 80 at liquid outlet 86 and is then circulate through fluid pump 65 which would pump second working fluid 51 back to the steam condenser/vaporizer 60 where the liquid second working fluid 51 will enter at point 61 for receipt of heat from the gaseous first working fluid 56, i.e., condensing steam 56, thereby causing the second working fluid 51 to vaporize and exit the condenser/vaporizer 60 at point 62. The vaporized second working fluid 51 will then pass to the organic working fluid turbine 72 entering at point 74. The second working fluid 51 is then expanded in the turbine 72 and exits at point 76 to be re-circulated back to the air-cooled condenser 80 as described above. It should be apparent to those skilled in the art that the term "organic working fluid turbine" may also be known as an "expander" or a "turboexpander". Moreover, in certain embodiments, bundles 91 are generally comprised of one or more coils through which the second working fluid flows.

In certain embodiments of the invention, the air-cooled condenser 80 utilized in the invention is quite different from the prior art air-cooled steam condensers, which typically consist of A-Frame steam condensers well known in the art. The air-cooled condenser of the invention is designed to condense the organic second working fluid as opposed to condensing steam in the prior art condensers. As such, most prior art power plant air-cooled condensers utilize a type of A-frame design with a large steam inlet distribution manifold header disposed above and connect to two large banks of substantially vertically angled condenser panels (left and right) arranged so that steam condensate exits each panel at the bottom of the panel and is collected by a condensate header at the bottom of each panel. Multiple large fans located near the bottom of the A-frame force air upwards through the angled condenser panels such that the cooling air exits the A-frame system at an angle to the horizontal (as opposed to vertically relative to the horizontal).

Figure 3:
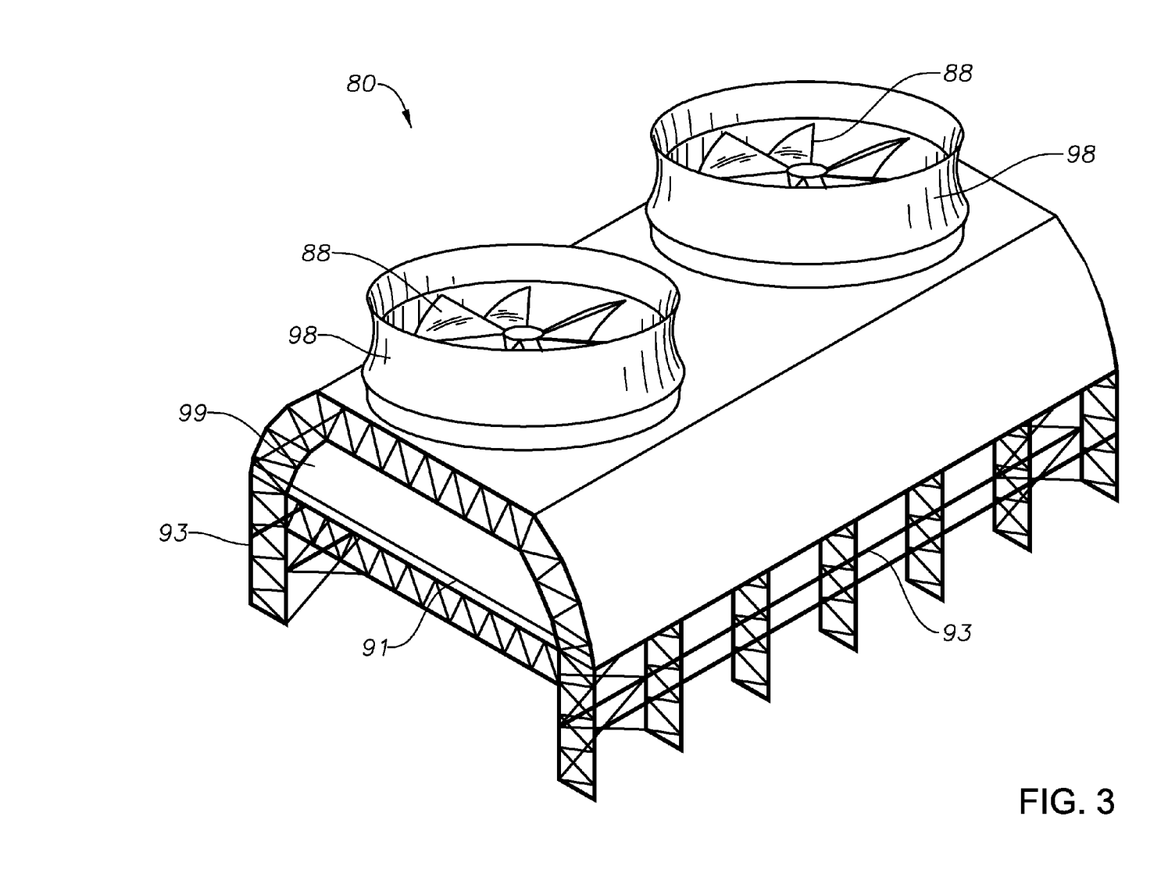
FIG. 3 illustrates one type of air cooled heat exchanger contemplated by the invention.

With reference to FIG. 3, one preferred embodiment for the air-cooled condenser 80 of the subject invention utilizes one or more heat exchanger coil bundles 91 which would be mounted on a support structure 93 with the heat exchanger bundles 91 positioned so as to be substantially horizontal and parallel to the ground. Moreover, the heat exchanger bundles 91 are suspended above the ground by the support structure 93 such that air might be drawn across the bundles 91 from below utilizing one or more large, induced draft fans 88 mounted above the array of heat exchanger bundles so as to draw air vertically up through the horizontally mounted heat exchanger bundles, thereby minimizing air turbulence and maximizing heat transfer therebetween. In certain embodiments, the fans 88 are preferably spaced apart from the heat exchanger bundles 91 by a distance sufficient to form a plenum 99 between the fan(s) 88 and the bundles 91, thereby allowing a single fan 88 to draw air through multiple heat exchanger bundles. In certain embodiments, plenum 99 is preferably partially or fully enclosed. In certain embodiments, one or more fans 88 preferably include a fan ring 98 around the fan 88 and extending up above the fan so as to maximize the distance from the top of the fan ring, where the air exits the air cooled condenser system 80, to the lower portion of the air cooled condenser system 80 where the air intake is located, thereby minimizing air recirculation.

It will be appreciated that in many prior art systems, condensing steam turbines were utilized for the bottoming cycle of combined cycle power plants because the exhaust steam from the bottoming cycle could be readily cooled with water cooled condensers and cooling towers. Water as the bottoming cycle working fluid has been desirable in the prior art because it is stable, inexpensive, safe and efficient. Moreover, it is readily cooled with water from cooling towers. However, such water cooling towers may be undesirable for various reasons such as environmental concerns and/or impractical in certain locations where water may not be readily available, such as deserts. In order to utilize a smaller, lower-cost air-cooled condenser as the heat exchanger for cooling in the bottoming cycle, therefore, it is necessary in the invention to eliminate the direct condensing of the steam working fluid by the ambient air heat exchanger and to replace the lower temperature section of a traditional prior art steam turbine bottoming cycle with a separate closed-loop, organic working fluid bottoming cycle. Those skilled in the art will appreciate that such a closed-loop, organic working fluid bottoming cycle can operate at higher pressures than the prior art. By expelling the exhaust the organic working fluid from the ORC turbine at higher pressures, the volume of the exhaust vaporized organic working fluid to be condensed is minimized, particularly as compared to the volume of ambient temperature steam, and as such, renders use of the smaller air-cooled condenser system described herein as much more practical. In addition, the pressure of this organic fluid can be easily maintained well above atmospheric pressure even for the lowest temperature condensing temperatures, thereby eliminating the concerns of air infiltration into the system. For example, if ammonia (R 717) were selected as the second working fluid, each pound of ammonia requires 1.38 cubic feet at 218.6 psia (at 102° F. condensing temperature) or 1.05 cubic feet at 286.4 psia (at 120° F. condensing temperature) which would be typical condensing temperatures for an air-cooled condenser. Given that the latent heat of vaporization of ammonia is around 634 btu/lb, each cubic foot of ammonia condensed would reject about 604 BTU versus about 4 BTU for each cubic foot of steam condensed in a prior art system. Therefore an air-cooled condenser utilized with steam must be designed to process approximately 150 times the volume as that of an air cooled condenser utilized with gaseous ammonia in order to reject the same amount of heat at the same normal condensing temperatures (120 F in the above example). One drawback to the use of air-cooled condensing however is that the power output is lower than for traditional water-cooled condensing and this degradation of output is especially severe during the high ambient temperature periods of the day and year. To compensate for this, in conjunction with the dual working fluids of the invention described herein, the invention employs turbine inlet cooling at the air inlet of the combustion turbine, thereby regaining the output of the combined cycle plant. Specifically, a turbine inlet cooling system used in conjunction with the gas turbine will more than compensate for the lower output of the steam bottoming cycle during high ambient periods.

With this in mind, turbine inlet cooling system 30 is provided with a cooling coil 32 having a chilling water inlet 34 and a chilling water outlet 36. Cooling coil 32 is generally disposed in the air flow path of combustion turbine 20, preferably at the air inlet 35 for combustion turbine 20, such as in a filter house. While the preferred embodiment will describe turbine inlet cooling utilizing chilled water as the cooling medium in cooling system circuit 31, other types of turbine inlet cooling are contemplated, including without limitation, the use of other substances, such as refrigerant, in coils 32 or heat transfer fluids other than water. In certain preferred embodiments, chilling water is utilized in turbine inlet cooling system 30. The chilling water is circulated through an evaporator 26 of a chiller as is known in the art, in order to reduce the temperature of the chilling water. Evaporator 26 generally includes a chilling water inlet 27 and a chilling water outlet 28. The chilling water will be cooled in the evaporator 26 by heat transfer with a refrigerant which will absorb heat from the chilling water and which will cause the refrigerant to be vaporized. This vaporized refrigerant will then enter a compressor 38 driven by a motor or similar device. The compressed refrigerant exits the compressor and flows to a condenser which will condense the refrigerant from a vapor to a liquid. The condenser may be a water cooled condenser or an air-cooled condenser. In a manner known in the art, the condensed refrigerant is then passed through a flow control device, such as an expansion valve, or similar pressure reduction device in order to reduce the pressure of the refrigerant, thereby resulting in a temperature reduction of the refrigerant such that when the low pressure, cooled, liquid refrigerant enters the evaporator 26, the refrigerant can be used to absorb heat from the chilling water, thereby causing the refrigerant to be vaporized, after which the refrigeration cycle repeats.

With reference to FIGS. 2A and 2B, in certain embodiments, to further enhance the effectiveness of turbine inlet cooling, the turbine inlet cooling system 30 may utilize a thermal energy storage system (TES) 100, which may include components such as a TES tank 102. TES tank 102 generally includes a water column 104 disposed therein and having a top header 106 and a bottom header 108, with one or more first ports 110 connected to the top header 106 and one or more second ports 112 connected to the bottom header 108. In configurations where a TES tank 102 is incorporated as part of the turbine inlet cooling system 30, the chilling water outlet 36 of coil 32 as well as the inlet 27 of evaporator 26 is in fluid communication with the top header 106 of TES tank 102 via the one or more first ports 110, while the inlet 34 of coil 32 as well as the outlet 28 of evaporator 26 is in fluid communication with the bottom header 108 of TES tank 102 via the one or more second ports 112. By including an optional thermal energy storage system 100 in the power plant 10, the high-ambient power output of the air-cooled power plant 10 of the invention can actually exceed that of traditional water-cooled combined cycle power plants while greatly reducing or eliminating the consumption of fresh water. Moreover, while the use of air-cooled condensing will result in slightly lower power output of power plant 10 during hot periods as compared to the prior art water-cooled systems, the use of turbine inlet cooling of the combustion turbine, particularly when combined with thermal energy storage, can help recapture most or all of this lost power.

In certain embodiments, the air-cooled condenser system 80 utilized to cool the second working fluid 51, may also be utilized, either simultaneously, or alternatively, to cool the refrigerant utilized in evaporator 26. In such case, as shown in FIGS. 1A-2B, evaporator refrigerant inlet 97 is in fluid communication with air-cooled condenser refrigerant outlet 96, while evaporator refrigerant outlet 95 is in fluid communication with air-cooled condenser refrigerant inlet 94. The refrigerant, designated as working fluid 39, flows through one or more bundles 91 as described above. In one embodiment, as described below, during peak hours when organic fluid bottoming system 50 is in use, air-cooled condenser system 80 is utilized to cool the second working fluid 51 from organic fluid bottoming system 50. During non-peak hours (such as night time) when organic fluid bottoming system 50 is not in use, air-cooled condenser system 80 may be utilized to cool refrigerant working fluid 39 during the process of charging thermal energy storage system 100, thereby maximizing use of the air-cooled condenser system 80.

In certain embodiments, additional heat transfer in conjunction with the air-cooled condenser system 80 may be achieved by utilizing a condenser spray system 120 as is illustrated in FIGS. 2A and 2B. Condenser spray system 120 generally includes a basin 122 positioned below air-cooled heat exchanger bundle 91 and a heat exchanger sprayer manifold 124 in fluid communication with the basin 122. A pump 123 is utilized to pump a liquid, such as water, from the basin 122 to the manifold 124. The manifold is provided with a plurality of openings or nozzles 125 and is positioned above heat exchanger bundles 91 so that bundles 91 may be sprayed with water to enhance heat transfer from the second working fluid. In certain embodiments, bundles 91 are generally comprised of one or more coils 92 through which the refrigerant flows. Those skilled in the art will appreciate that such a system is particularly effective where bundles 91 are arranged to be substantially horizontal and the fan 88 is placed above the bundles 91 to induce air flow across the bundles in a substantially vertical direction of airflow.

In another preferred embodiment, a drain pan having a cooling coil condensate drain 128 is position below the chilled water cooling coils 32 of turbine inlet cooling system 30 and is disposed to collect condensate water from coils 32. Via cooling coil condensate drain 128, the drain pan is fluidly connected to condenser spray basin 122, permitting use of the condensate water as part of condenser spray system 120 so as to minimize or eliminate the amount of basin makeup water 126 required from external water sources.

In one embodiment of the invention, the turbine inlet air temperature (often called the T2 temperature) can be precisely adjusted to a higher or lower temperature to allow the overall output of the air-cooled, combined cycle plant to be maintained at a constant MW output regardless of the ambient temperature. This is especially true if thermal energy storage is provided along with the TIC system. In addition to maintaining a fixed MW output regardless of ambient temperature, the output can also be varied up or down by varying the T2 turbine inlet temperature, which can add the ability for the combined cycle plant to be used for voltage regulation grid support with a very fast response time. The ability to regulate output in this manner is becoming increasingly important as more intermittent, non-firm renewable power generation is added to the grid which will require fast response "firming" power to make up the shortfalls or excesses caused by the fluctuating renewables. Thus, in one embodiment of the invention, the turbine inlet air temperature T2 may be varied to maintain the overall combined cycle plant output at a desired power output level. A preferred method for varying the T2 temperature is by varying the flow of chilled water through the cooling coil 35 using either a flow control valve or preferably by varying the speed of a secondary pump 116 disposed to pump chilled water through the cooling coil 35.

As described above, in one embodiment of the invention, the air-cooled condenser may serve a dual function, as a heat rejection system for both the ORC system and the TIC system. Specifically, one advantage of using an air-cooled, refrigerant condenser as described in certain embodiments instead of a traditional air-cooled, steam condenser is that the air-cooled, refrigerant condenser permits the use of the air-cooled condenser of the system for dual purposes, depending on the time of day and whether the combined cycle plant is running or not. When the combined cycle plant is operating to generate power, the air-cooled condenser would be dedicated for use as the heat rejection device for the thermal bottoming cycle as described above. However, when the combined cycle plant is not generating power (usually at night, for instance), then the air-cooled condenser of the invention can be utilized as the heat rejection for the turbine inlet cooling system to the extent a thermal storage system is employed. In certain embodiments of the invention, this is an important feature since turbine inlet cooling with TES system would ideally operate at night when the cost of power is less, and as such, it would utilize the low cost grid power to drive the turbine inlet cooling chiller compressor to provide chilled water which would be stored in the TES tank for later use when the combined cycle is operating to generate power. The heat that is extracted from the stored chilled water would then be rejected to the refrigerant working fluid and then to the air-cooled condenser. During the day, when power prices are higher, the combined cycle plant would again begin generating power and the air-cooled condenser would then be switched back to the ORC bottoming cycle while the turbine inlet cooling system would run entirely off the stored TES chilled water. Since the turbine inlet cooling chiller system would no longer be operable without the use of the air-cooled condensers, having switched back to a heat sink for power generation rather than as a heat sink for refrigeration, the TES system must be utilized. Although not necessary, preferably the dual purpose air-cooled condenser could utilize the same working fluid for both the separate working fluid for the ORC bottoming cycle and also as the refrigerant for the chiller system of the turbine inlet cooling system. In one preferred embodiment, such working fluid could be either ammonia or R134a, although other fluids may also be utilized. Notably, the heat rejection required for the ORC bottoming cycle is much larger than that required for the turbine inlet cooling system (on the order of 7 to 10 times larger) so only a portion of the total ORC air-cooled condensers would be needed to be shared with the turbine inlet cooling refrigeration system. Of course, in an alternative embodiment, separate air-cooled condensers may be utilized for each of the ORC system and the turbine inlet cooling system which is anticipated to be the preferred embodiment for most projects.

Furthermore, while a preferred horizontal bundle, air-cooled condenser has been described herein for use with certain embodiments of the invention combining a steam turbine topping system with an organic working fluid bottoming system, those of ordinary skill in the art will appreciate that other embodiments of the invention which employ turbine inlet cooling with a steam turbine topping system and an organic working fluid bottoming system may be utilized with any configuration of air-cooled condenser.

In summary, the system of the invention provides a method for eliminating the use of water for condensing steam from a steam bottoming cycle from a gas turbine combined cycle power plant by utilizing heat from the gas turbine in two separate working fluid circuits that each use a different working fluid. The high temperature first circuit will use the traditional water working fluid such that the steam which is produced from the exhaust heat of a gas turbine is first introduced into a backpressure steam turbine at a higher first steam pressure and then extracted from the steam turbine at a lower second steam pressure which is still above atmospheric pressure, and condensing said second steam pressure by heat exchange in a steam condenser/ORC vaporizer heat exchanger. This heat exchanger use the ORC working fluid of a second fluid circuit as the condensing medium (instead of water or air as in the prior art). Condensed steam, which is condensed to a liquid in the vaporizer heat exchanger will be pumped back to the HRSG to repeat the steam cycle. Meanwhile the heat extracted from the condensing of the steam will be transferred to the separate ORC working fluid. This ORC working fluid is selected to have a lower boiling point than that of water, thereby permitting the ORC working fluid to be used for additional work (rather than rejecting this heat directly to an air-cooled condenser as is the prior art). The heat from the condensing steam will vaporize the ORC working fluid which will then be used to drive an expander in the second circuit to produce power. The exhaust from the expander of the second circuit will be condensed in an air-cooled condenser heat exchanger and the condensed liquid will then be pumped back to the vaporizer heat exchanger. The inlet air of the gas turbine will be cooled, at least some of the time, utilizing a turbine inlet cooling system. The turbine inlet cooling system utilizes a circulating chilled liquid to regain some of the power capacity which may be otherwise lost during operation of both the gas turbine and the steam turbine cycle during periods of high ambient temperature. In one preferred embodiment the steam is extracted from the steam turbine at a pressure in the range of approximately 2 psig to 35 psig. The air-cooled condenser includes an air-cooled heat exchanger system that is fluidly coupled to the expander of the second circuit and operable to release heat from the second circuit working fluid, i.e., the ORC working fluid. Preferably the air-cooled heat exchanger includes one or more coils, arranged in elongated bundles and supported so as to be substantially horizontal with a substantially horizontal induced draft fan mounted above the bundle(s).

In certain embodiments, the turbine inlet cooling system is a separate circuit that utilizes chilled fluid flowing through one or more cooling coils mounted in the inlet air stream of the gas turbine. The chilled fluid is preferably water or primarily water, and the chilled fluid is cooled through the use of one or more mechanical chillers. The chilled water may be at least partially stored in a chilled water thermal storage tank having an upper diffuser for supply and return of warmer water and a lower diffuser for supply and return of colder water. Some or all of the cooling turbine inlet cooling system may be supplied by the stored chilled water to reduce or eliminate the need for the chillers to operate during peak power periods.

During certain peak temperature periods, the condensate which is produced at the cooling coils from cooling the inlet turbine air to a temperature below the dew point when the gas turbine inlet cooling system is active may be collected and used to provide evaporative cooling to the air-cooled condensers. In one embodiment, the condensate may be sprayed directly on the air-cooled condenser bundles to provide direct contact between the condensate water and the condenser heat exchangers. A basin may be deployed below the air cooled heat exchanger bundles to collect excess water which remains unevaporated, and thereafter, the water may be recirculated in the spraying system. In the alternative, or in addition to this cooling water, water for the spraying system may be supplied from other sources, such as city water or ground water or river water to supplement the condensate water used for spraying the air-cooled heat exchanger. An additional benefit of the foregoing, is that a fresh water rinse cycle may be provided just prior to the conclusion of the spraying cycle to rinse the condenser coil of any remaining mineral residues which might be entrained in the recycled spray water.

Although the steam/organic rankine ("ST/ORC") hybrid cycle system of the invention may be applied to all condensing steam cycle plants, it is most useful for gas turbine combined cycles and for direct-fired (coal) plants. In another embodiment of the invention, rather than utilizing waste heat from a combustion turbine as the heat source for the ST/ORC hybrid cycle system of the invention, heat from other sources may be utilized. In certain embodiments, for example, waste heat may be recovered from industrial processes, such as for example, cement plants, steel plants, kilns, or other manufacturing plants. Of course, in such cases, the need for turbine inlet cooling is eliminated with the elimination of the combustion turbine as the heat source. Thus, in one embodiment of the invention, an industrial plant comprises a source of waste heat from an industrial process; a steam turbine topping system disposed to utilize exhaust heat from the waste heat source to heat a first working fluid; an Organic Rankine Cycle (ORC) bottoming system disposed to utilize exhaust steam from the steam turbine topping system to heat a second working fluid; and an air-cooled heat exchanger disposed to cool gaseous second working fluid from the ORC bottoming system.

The system of the invention has numerous advantages over the prior art systems. First, the invention eliminates the use of wet cooling towers as well as air-cooled steam condensers by incorporating an ORC bottoming cycle, which volume flow is approximately $1/122$ that of steam, thus resulting in substantial reduction in the installed cost of the air-cooled condenser for a power plant steam bottoming cycle. Further, it is estimated that air cooling for a typical 500 MW combined cycle plant could save approximately 1100 gpm which, on an annual basis, saves about 550 million gallons. Moreover, cooling the gas turbine exhaust, which is not beneficial in steam plant, and removing the deaerator, will likely allow the ST/ORC power plant of the invention to generate the same output as an equivalent sized air-cooled condensing steam plant of the prior art operating under the same conditions. Additionally, by integration of a turbine inlet cooling system and TES system, the plant output during high ambient temperature summer operation can be increased, more than offsetting any performance loss associated with air cooling in hot weather. The high efficiency air-cooled condenser also reduces fan losses and operation and maintenance costs below that of current prior art designs. The ST/ORC bottoming cycle also reduces the amount of live steam needed for the deaerator, reduces vacuum pump power, and chemical treatment of feed water, all resulting from total elimination of vacuum stages of the steam turbine. Finally, the ST/ORC system provides a better match between gas turbine exhaust gas cooling and ST/ORC heating curves, thus reducing efficiency losses between the curves.

An exemplary methodology of the present invention provides a method for producing power from a combined cycle power plant, said method comprising the steps of cooling inlet air to a combustion turbine, the cooled inlet air having a first temperature; utilizing a steam turbine topping cycle in association with the combustion turbine to generate power; utilizing an ORC bottoming cycle in association with the steam turbine topping cycle to generate power; and utilizing an air-cooled condenser to remove heat from the ORC bottoming cycle.

While certain features and embodiments of the disclosure have been described in detail herein, it will be readily understood that the disclosure encompasses all modifications and enhancements within the scope and spirit of the following claims. Furthermore, no limitations are intended in the details of construction or design herein shown, other than as described in the claims below. Moreover, those skilled in the art will appreciate that description of various components as being oriented vertically or horizontally are not intended as limitations, but are provided for the convenience of describing the disclosure.

It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined herein.

What is claimed is:

1. A combined cycle power plant comprising:
a combustion turbine system;
a turbine inlet cooler (TIC) system disposed to cool inlet air entering the combustion turbine system;
a steam turbine topping system having an exhaust steam outlet, the steam turbine topping system disposed to utilize exhaust heat from the combustion turbine system to heat a first working fluid;
an Organic Rankine Cycle (ORC) bottoming system comprising a vaporizer in fluid communication with the exhaust steam outlet, the ORC bottoming system disposed to utilize exhaust steam from the steam turbine topping system to vaporize a second working fluid; and
an air-cooled heat exchanger disposed to cool gaseous second working fluid from the ORC bottoming system.

2. The system of claim 1, further comprising a thermal energy storage (TES) tank, said TES tank in fluid communication with the turbine inlet cooler system.

3. The system of claim 1, further comprising an evaporator having a chilling water inlet and a chilling water outlet, and wherein the turbine inlet cooler comprises a TIC cooling coil having a TIC cooling coil inlet in fluid communication with the evaporator chilling water outlet and a TIC cooling coil outlet in fluid communication with the evaporator chilling water inlet.

4. The system of claim 3, further comprising a thermal energy storage (TES) tank, said TES tank in fluid communication with the TIC cooling coil.

5. The system of claim 1, wherein the first working fluid comprises water and the second working fluid comprises a fluid other than water.

6. The system of claim 5, wherein the second working fluid comprises an organic fluid.

7. A combined cycle power plant comprising:
a combustion turbine system;
a turbine inlet cooler (TIC) system disposed to cool inlet air entering the combustion turbine system;
a steam turbine topping system disposed to utilize exhaust heat from the combustion turbine system to heat a first working fluid;
an Organic Rankine Cycle (ORC) bottoming system disposed to utilize exhaust steam from the steam turbine topping system to heat a second working fluid; and
an air-cooled heat exchanger disposed to cool gaseous second working fluid from the ORC bottoming system, wherein
the steam turbine topping system comprises:
a heat recovery steam generator (HRSG) having an inlet and outlet for exhaust from the combustion turbine system and a first working fluid inlet and outlet;
a steam turbine having a steam inlet and an exhaust outlet, wherein the steam inlet is in fluid communication with the first working fluid outlet of the HRSG; and
a first heat exchanger, said first heat exchanger having a first working fluid inlet and outlet and an organic working fluid inlet and outlet, wherein the first working fluid inlet is in fluid communication with the exhaust outlet of the steam turbine and the first working fluid outlet is in fluid communication with the first working fluid inlet of the HRSG;
the air-cooled heat exchanger (ACHE) comprises:
an ACHE cooling coil having an ACHE cooling coil inlet and outlet, wherein the ACHE cooling coil outlet is in fluid communication with the organic working fluid inlet of the first heat exchanger; and
a fan disposed to urge air flow across the ACHE cooling coils; and
the ORC bottoming system comprises:
an organic working fluid turbine having a second working fluid inlet and a second working fluid outlet, wherein the second working fluid inlet is in fluid communication with the second working fluid outlet of the first heat exchanger and the second working fluid turbine outlet is in fluid communication with the ACHE cooling coil inlet.

8. The system of claim 7, wherein the ACHE cooling coil forms an elongated bundle, the elongated bundle disposed to be substantially horizontal and wherein the fan is a substantially horizontal induced draft fan comprising a fan blade and a motor, the fan mounted adjacent the elongated ACHE cooling coil bundle.

9. The system of claim 7 further comprising a condenser spray system disposed to spray water on the ACHE cooling coils.

10. The system of claim 9, wherein the condenser spray system comprises a water manifold disposed adjacent the ACHE cooling coils, said water manifold having a multiplicity of apertures defined therein, a water basin positioned below the water manifold and a pump in fluid communication with the water basin and the water manifold.

11. The system of claim 7, further comprising a preheater fluidly connected to first heat exchanger.

12. A combined cycle power plant comprising:
a combustion turbine system;
a turbine inlet cooler (TIC) system disposed to cool inlet air entering the combustion turbine system;
a steam turbine topping system disposed to utilize exhaust heat from the combustion turbine system to heat a first working fluid;
an Organic Rankine Cycle (ORC) bottoming system disposed to utilize exhaust steam from the steam turbine topping system to heat a second working fluid;
an air-cooled heat exchanger disposed to cool gaseous second working fluid from the ORC bottoming system;
an evaporator having a chilling water inlet and a chilling water outlet, and wherein the turbine inlet cooler comprises a TIC cooling coil having a TIC cooling coil inlet in fluid communication with the evaporator chilling water outlet and a TIC cooling coil outlet in fluid communication with the evaporator chilling water inlet; and
a thermal energy storage (TES) tank, said TES tank in fluid communication with the TIC cooling coil, wherein the TES tank comprises a liquid column having a top and a bottom, a first fluid port in communication with the top of the liquid column and a second fluid port in communication with the bottom of the liquid column, wherein said first fluid port is in fluid communication with said evaporator chilling water inlet and the second fluid port is in fluid communication with said evaporator chilling water outlet.

13. The system of claim 12, wherein the evaporator further comprises an evaporator fluid inlet and an evaporator fluid outlet, and wherein the ACHE further comprises a secondary fluid inlet and a secondary fluid outlet, wherein said ACHE secondary fluid inlet is in fluid communication with said evaporator fluid outlet and said ACHE secondary fluid outlet is in fluid communication with said evaporator fluid inlet.

14. The system of claim 13, further comprising a compressor in fluid communication with the and disposed between the evaporator fluid outlet and the ACHE secondary fluid inlet.

15. A combined cycle power plant comprising:
a gas turbine having an air inlet and an air outlet;
a heat recovery steam generator (HRSG) having an HRSG air inlet, an HRSG air outlet, a first working fluid inlet and a first working fluid outlet, wherein the HRSG air inlet is in fluid communication with the gas turbine air outlet;
a steam turbine having a steam inlet and an exhaust outlet, wherein the steam inlet is in fluid communication with the HRSG first working fluid outlet;
a first heat exchanger, said first heat exchanger having a first working fluid inlet and outlet and an organic working fluid inlet and outlet, wherein the first working fluid inlet of the first heat exchanger is in fluid communication with the exhaust outlet of the steam turbine and the first working fluid outlet of the first heat exchanger is in fluid communication with the HRSG first working fluid inlet;
an organic working fluid turbine having an organic working fluid inlet and an organic working fluid outlet, wherein the organic working fluid inlet is in fluid communication with the organic working fluid outlet of the first heat exchanger;
an air-cooled heat exchanger (ACHE) having an ACHE cooling coil, an ACHE cooling coil inlet, an ACHE cooling coil outlet, and a fan disposed to urge air flow across the ACHE cooling coil, wherein the ACHE cooling coil outlet is in fluid communication with the organic working fluid inlet of the first heat exchanger and the ACHE cooling coil inlet is in fluid communication with the organic working fluid turbine outlet; and
a turbine inlet cooler (TIC) disposed adjacent the air inlet of the gas turbine, said turbine inlet cooler having a TIC cooling coil, a TIC cooling coil inlet and a TIC cooling coil outlet.

16. The system of claim 15, further comprising
an evaporator having a chilling water inlet and a chilling water outlet; and
a thermal energy storage (TES) tank having a liquid column characterized by a top and a bottom, a first fluid port in communication with the top of the liquid column and a second fluid port in communication with the bottom of the liquid column, wherein said first fluid port is in fluid communication with the evaporator chilling water inlet and the second fluid port is in fluid communication with the evaporator chilling water outlet,
wherein the TIC cooling coil inlet is in fluid communication with the bottom of the TES tank liquid column and the TIC cooling coil outlet is in fluid communication with top of the TES tank liquid column.

17. The system of claim 16, further comprising a compressor and wherein the evaporator further comprises an evaporator fluid inlet and an evaporator fluid outlet, and wherein the ACHE further comprises a secondary fluid inlet and a secondary fluid outlet, wherein said ACHE secondary fluid inlet is in fluid communication with said evaporator fluid outlet and said ACHE secondary fluid outlet is in fluid communication with said evaporator fluid inlet, wherein the compressor in fluid communication with and disposed between the evaporator fluid outlet and the ACHE secondary fluid inlet.

18. The system of claim 15, wherein the ACHE cooling coil forms an elongated bundle, the elongated bundle disposed to be substantially horizontal, and wherein the fan is a substantially horizontal, induced draft fan comprising a fan blade and a motor, the fan mounted adjacent the elongated ACHE cooling coil bundle.

19. A combined cycle power plant comprising:
a first steam turbine topping circuit utilizing water as a first working fluid, the first steam turbine topping circuit comprising a steam turbine with an exhaust steam outlet;
a second organic fluid bottoming circuit utilizing a non-water fluid as a second working fluid;
a steam condenser/Organic Rankine Cycle (ORC) vaporizer comprising a steam inlet, the steam inlet of the steam condenser/ORC vaporizer being in fluid communication with the exhaust steam outlet of the first steam turbine topping circuit thereby operatively connecting the first and second circuits whereby outlet seam from the first circuit vaporizes the second working fluid;
a third refrigeration circuit disposed to circulate a refrigerant therein;
a fourth turbine inlet cooling circuit disposed to circulate chilling water; and
an evaporator operatively connecting the third and forth circuits.

20. The combined cycle power plant of claim 19, further comprising
an air cooled heat exchanger operatively connecting the second and third circuits.

* * * * *